(12) United States Patent
Kao

(10) Patent No.: US 11,709,414 B2
(45) Date of Patent: Jul. 25, 2023

(54) WAVELENGTH CONVERSION MODULE AND PROJECTOR

(71) Applicant: Coretronic Corporation, Hsin-Chu (TW)

(72) Inventor: Wei-Hua Kao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/463,560

(22) Filed: Sep. 1, 2021

(65) Prior Publication Data
US 2022/0075247 A1    Mar. 10, 2022

(30) Foreign Application Priority Data
Sep. 10, 2020    (CN) .......................... 202010946241.0

(51) Int. Cl.
| G03B 21/20 | (2006.01) |
| G02B 26/00 | (2006.01) |
| G02B 7/00 | (2021.01) |
| G03B 21/16 | (2006.01) |

(52) U.S. Cl.
CPC .......... G03B 21/204 (2013.01); G02B 7/008 (2013.01); G02B 26/008 (2013.01); G03B 21/16 (2013.01)

(58) Field of Classification Search
CPC ...... G02B 7/008; G02B 21/16; G02B 26/008; G03B 21/16; G03B 21/204
See application file for complete search history.

(56) References Cited

U.S. PATENT DOCUMENTS

| 2015/0229892 A1* | 8/2015 | Dai ........................ G03B 21/16 |
| | | 353/31 |
| 2016/0077325 A1* | 3/2016 | Tsai ..................... H04N 9/3114 |
| | | 353/31 |
| 2020/0064619 A1 | 2/2020 | Hsu et al. |

FOREIGN PATENT DOCUMENTS

| CN | 104516177 A * | 4/2015 | ............ G03B 21/14 |
| CN | 106199947 | 12/2016 | |
| CN | 104834169 | 4/2017 | |
| CN | 106909021 | 6/2017 | |
| CN | 109782429 | 5/2019 | |
| CN | 208903064 | 5/2019 | |
| CN | 209624966 | 11/2019 | |
| CN | 211123610 | 7/2020 | |

OTHER PUBLICATIONS

"Office Action of China Counterpart Application", dated Sep. 29, 2022, p. 1-p. 9.

* cited by examiner

*Primary Examiner* — Evan P Dzierzynski
*Assistant Examiner* — Nathaniel J Lee
(74) *Attorney, Agent, or Firm* — JCIPRNET

(57) ABSTRACT

A wavelength conversion module and a projector including the wavelength conversion module are provided. The wavelength conversion module includes a substrate and a wavelength conversion layer. The substrate has a first surface and a second surface opposite to each other. The substrate includes a plurality of turbulent portions, and the turbulent portions are recessed in at least one of the first surface and the second surface. The wavelength conversion layer is disposed on the first surface of the substrate, and a distribution area of the turbulent portions accounts for more than 60% of an exposure area of the substrate. The wavelength conversion module and the projector provided by the disclosure exhibit favorable heat dissipation efficiency.

14 Claims, 18 Drawing Sheets

WAVELENGTH CONVERSION MODULE AND PROJECTOR

CROSS-REFERENCE TO RELATED APPLICATION

This application claims the priority benefit of China application serial No. 202010946241.0, filed on Sep. 10, 2020. The entirety of the above-mentioned patent application is hereby incorporated by reference herein and made a part of this specification.

BACKGROUND

Technical Field

The disclosure relates to an optical module and a projector, and in particular, relates to a wavelength conversion module and a projector including the wavelength conversion module.

Description of Related Art

Generally, regarding heat dissipation of a wavelength conversion module used in a laser projector, protrusions are formed on the surface of the aluminum substrate through a punching process, or the aluminum substrate and three-dimensional fan blades are made through a casting process. The above two design concepts are to create three-dimensional obstacles to generate forced convection, and heat energy is thereby transmitted into the air through thermal convection. Nevertheless, the manner of producing protrusions on the surface of the aluminum substrate through the punching process is limited due to the fact that the punching process may not produce protrusions greater than 0.5 millimeters, so unfavorable heat dissipation efficiency is thereby provided. The casting process may overcome the disadvantages of the punching process when being used to manufacture the aluminum substrate and the three-dimensional fan blades, but costs of the casting process are significantly high and therefore the casting process lacks cost competitiveness in commercial applications. Besides, when forced convection is produced to improve heat dissipation, noise is generated at the same time. Therefore, how to effectively enhance heat dissipation efficiency of the wavelength conversion module and at the same time lower manufacturing costs and prevent or reduce operation noise of the wavelength conversion module is an important issue.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wavelength conversion module and a projector adopting the wavelength conversion module which exhibit favorable heat dissipation efficiency.

Other objects and advantages of the disclosure may be further illustrated by the technical features broadly embodied and described as follows.

In order to achieve one or a portion of or all of the objects or other objects, an embodiment of the disclosure provides a wavelength conversion module including a substrate and a wavelength conversion layer. The substrate has a first surface and a second surface opposite to each other. The substrate includes a plurality of turbulent portions, and the turbulent portions are recessed in at least one of the first surface and the second surface. The wavelength conversion layer is disposed on the first surface of the substrate, and a distribution area of the turbulent portions accounts for more than 60% of an exposure area of the substrate.

In order to achieve one or a portion of or all of the objects or other objects, an embodiment of the disclosure provides a projector including an illumination system, a light valve, and a projection lens. The illumination system is configured to provide an illumination beam and includes a light source and a wavelength conversion module. The light source is configured to provide an excitation beam. The wavelength conversion module is disposed in a transmission path of the excitation beam, and the wavelength conversion module includes a substrate and a wavelength conversion layer. The substrate has a first surface and a second surface opposite to each other. The substrate includes a plurality of turbulent portions, and the turbulent portions are recessed in at least one of the first surface and the second surface. The wavelength conversion layer is disposed on the first surface of the substrate. A distribution area of the turbulent portions accounts for more than 60% of an exposure area of the substrate. The wavelength conversion layer is configured to convert the excitation beam into a conversion beam. The illumination beam includes the conversion beam. The light valve is disposed in a transmission path of the illumination beam and is configured to convert the illumination beam into an image beam. The projection lens is disposed in a transmission path of the image beam and is configured to project the image beam out of the projector.

To sum up, the embodiments of the invention have at least one of the following advantages or effects. In the design of the wavelength conversion module provided by the disclosure, the turbulent portions of the substrate in the embodiments are recessed in at least one of the first surface and the second surface, and the distribution area of the turbulent portions accounts for more than 60% of the exposure area of the substrate. Therefore, the substrate has a large heat dissipation area through such design of the turbulent portions, and heat dissipation efficiency of the wavelength conversion module and the projector adopting the wavelength conversion module is accordingly increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
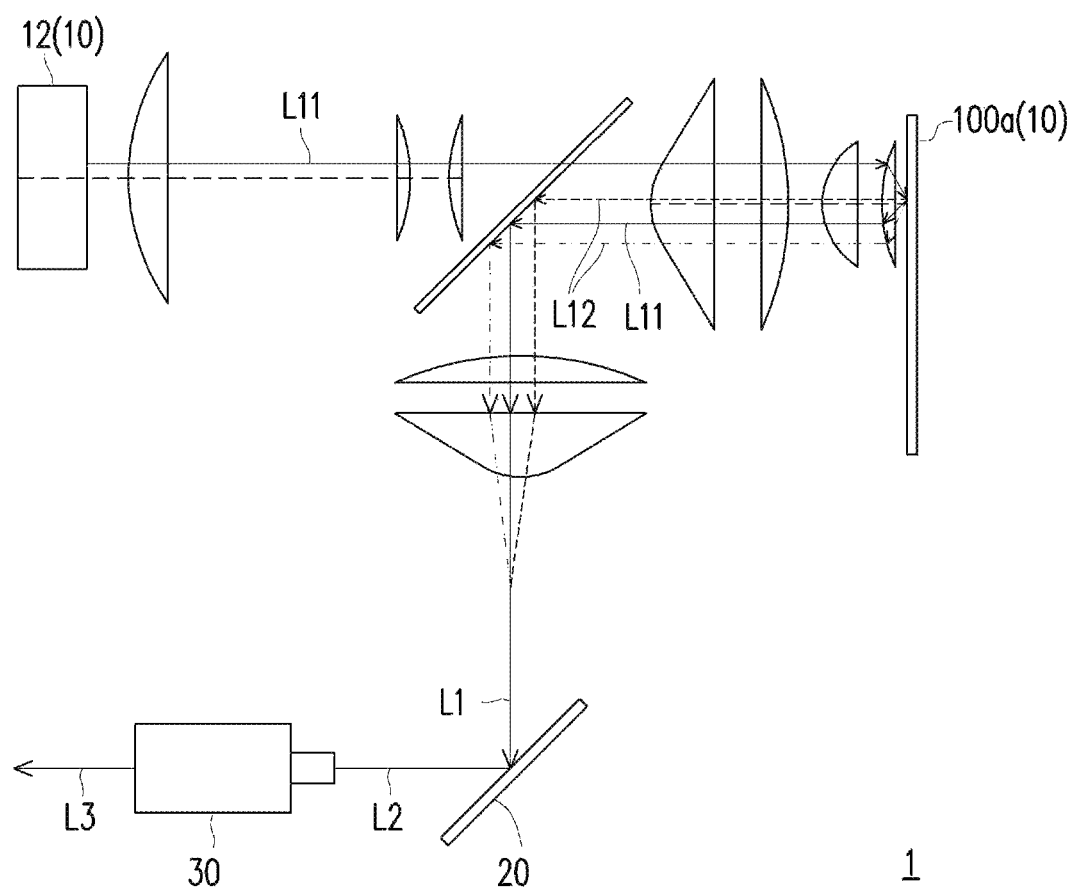
FIG. 1 is a schematic view of a structure of a projector according to an embodiment of the disclosure.

FIG. 1 is a schematic view of a structure of a projector according to an embodiment of the disclosure. With reference to FIG. 1 first, in this embodiment, a projector 1 includes an illumination system 10, a light valve 20, and a projection lens 30. The illumination system 10 is configured to provide an illumination beam L1 and includes a light source 12 and a wavelength conversion module 100a. The light source 12 is configured to provide an excitation beam L11, where the light source 12 is an excitation light source, such as a laser diode array. Specifically, light sources that meet the volume requirements may all be implemented according to actual design, and the disclosure is not limited thereto. The wavelength conversion module 100a is disposed in a transmission path of the excitation beam L11 and is configured to convert the excitation beam L11 into a conversion beam L12. Herein, the illumination beam L1 includes the conversion beam L12.

The light valve 20 is disposed in a transmission path of the illumination beam L1 and is configured to convert the illumination beam L1 into an image beam L2. Herein, the light valve 20 is, for example, a reflective light modulator such as a liquid crystal on silicon panel (LCoS panel) and a digital micro-mirror device (DMD). In an embodiment, the light valve 20 is, for example, a transmissive light modulator such as a transparent liquid crystal panel, an electro-optical modulator, a maganeto-optic modulator, and an acousto-optic modulator (AOM), but a form and a type of the light valve 20 is not particularly limited in the embodiment. Detailed steps and implementation of a method of converting the illumination beam L1 into the image beam L2 by the light valve 20 may be obtained through sufficient teachings, suggestions, and other details in the art, and that repeated description is not provided herein. The projection lens 30 is disposed in a transmission path of the image beam L2 and is configured to project the image beam L2 out of the projector 1. The projection lens 30 includes, for example, one or a plurality of optical lens combinations with refracting powers including various non-planar lens combinations of a biconcave lens, a biconvex lens, a concave-convex lens, a convex-concave lens, a plane-convex lens, and a plane-concave lens, for example. In an embodiment, a planar optical lens may be included in the projection lens 30, so that the image beam L2 from the light valve 20 may be converted into a projection beam L3 and projected out of the projector 1 through a reflective or penetrative manner. Herein, a form and a type of the projection lens 30 is not particularly limited in the embodiment.

Figure 2A:
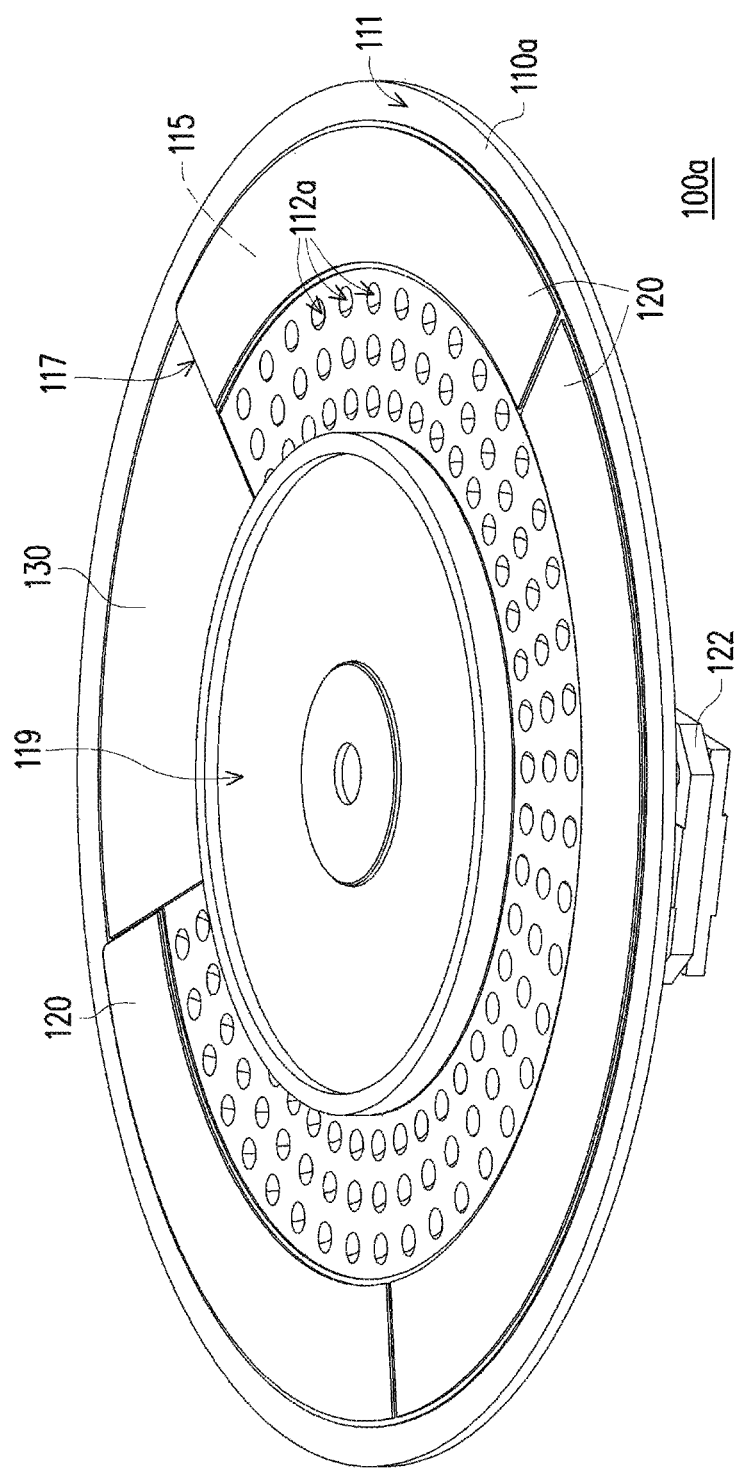
FIG. 2A is a three-dimensional schematic view of a wavelength conversion module of the projector of FIG. 1.
Figure 2B:
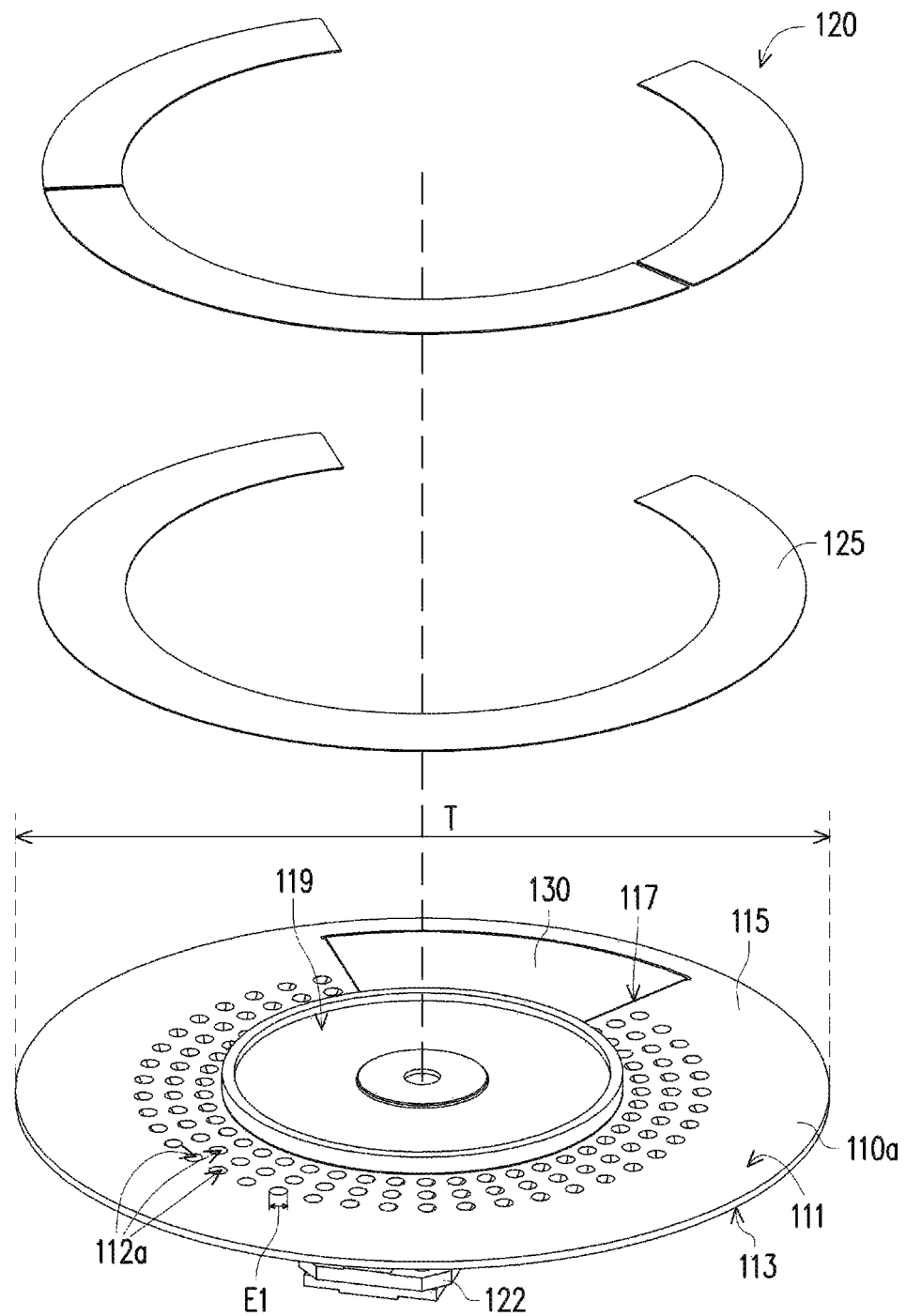
FIG. 2B is a local exploded three-dimensional schematic view of the wavelength conversion module of FIG. 2A.
Figure 2C:
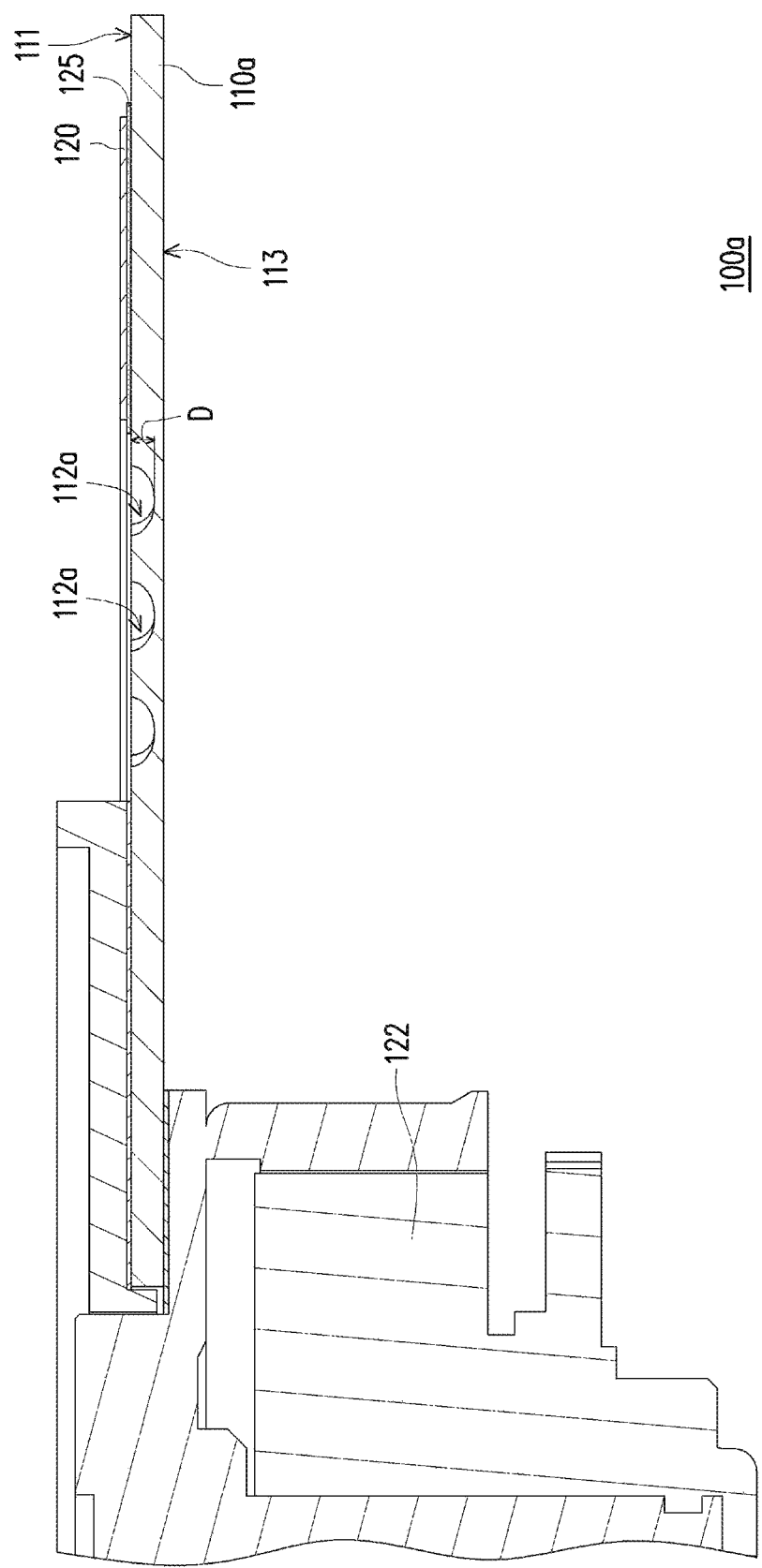
FIG. 2C is a local cross-sectional schematic view of the wavelength conversion module of FIG. 2A.

FIG. 2A is a three-dimensional schematic view of a wavelength conversion module of the projector of FIG. 1. FIG. 2B is a local exploded three-dimensional schematic view of the wavelength conversion module of FIG. 2A. FIG. 2C is a local cross-sectional schematic view of the wavelength conversion module of FIG. 2A. With reference to FIG. 2A, FIG. 2B, and FIG. 2C together, in this embodiment, the wavelength conversion module 100a includes a substrate 110a and a wavelength conversion layer 120. The substrate 110a has a first surface 111 and a second surface 113 opposite to each other. The substrate 110a includes a plurality of turbulent portions 112a, and the turbulent portions 112a are recessed in at least one of the first surface 111 and the second surface 113. In this embodiment, the turbulent portions 112a are recessed in the first surface 111. The wavelength conversion layer 120 is disposed on the first surface 111 of the substrate 110a through an adhesion layer 125. In particular, a distribution area of the turbulent portions 112a in this embodiment accounts for more than 60% of an exposure area of the substrate 110a. In this way, a heat dissipation area of the substrate 110a may be increased, and that heat dissipation efficiency of the wavelength conversion module 100a is thereby increased.

To be specific, the substrate 110a in this embodiment has a wavelength conversion region 115 and an optical region 117 disposed in an adjacent manner in a circumferential direction. The wavelength conversion layer 120 is located in the wavelength conversion region 115, and the optical region 117 is provided with a reflective structure 130 or a transparent structure (not shown). That is, the wavelength conversion module 100a in this embodiment may be a reflective wavelength conversion module or a transmissive wavelength conversion module. A reflective wavelength conversion module is taken as an example in this embodiment. The optical region 117 is provided with the reflective structure 130 so that the excitation beam L11 transmitted to the optical region 117 is reflected by the reflective structure 130 and thus is further transmitted to other optical elements. In an embodiment that is not shown, a transmissive wavelength conversion module may be applied. In this case, the optical region 117 is provided with a transparent structure such as glass or an opening, so that the excitation beam L11 transmitted to the optical region 117 may pass through the transparent structure and is then transmitted to other optical elements. The disclosure is not intended to limit the wavelength conversion module 100a to be the reflective type or the transmissive type. Herein, a material of the substrate 110a includes metal, such as stainless steel or aluminum alloy.

Further, the turbulent portions 112a in this embodiment are formed on at least one of the first surface 111 and the second surface 113 through punching performed on the substrate 110a. After punching is performed on the substrate 110a, protrusions on the second surface 113 may be polished through a polishing manner, and that the turbulent portions 112a recessed in the first surface 111 are thereby formed.

As shown in FIG. 2B, a length of a longest side E1 of each of the turbulent portions 112a in this embodiment is less than 10% of a diameter T of the substrate 110a. The turbulent portions 112a are equally spaced and arranged in an array in a radial direction and the circumferential direction of the substrate 110a. Herein, shapes of the turbulent portions 112a are completely identical, but are not limited thereto. In another embodiment that is not shown, the shapes of the turbulent portions may be partially identical. Further, with reference to FIG. 2C, a cross-sectional shape of each of the turbulent portions 112a in this embodiment is, but not limited to, a semicircle, for example. Preferably, a depth D of each of the turbulent portions 112a is less than or equal to 0.5 millimeters.

Further, with reference to FIG. 2A, FIG. 2B, and FIG. 2C, the wavelength conversion module 120 in this embodiment further includes a driver assembly 122. The driver assembly 122 is, but not limited to, a motor, for example. The substrate 110a further includes a holder region 119, the wavelength conversion region 115 surrounds the holder region 119, and the driver assembly 122 is located in the holder region 119 to drive the substrate 110a to rotate. Herein, the exposure area of the substrate 110a is a regional area on the first surface 111 outside the holder region 119, the wavelength conversion region 115, and the optical region 117.

In short, since the distribution area of the turbulent portions 112a in this embodiment accounts for more than 60% of the exposure area of the substrate 110a, the substrate 110a has a large heat dissipation area through such design of the turbulent portions 112a. Therefore, heat dissipation efficiency of the wavelength conversion module 100a and the projector 1 adopting the wavelength conversion module 100a is accordingly increased. Further, since the turbulent portions 112a in this embodiment are recessed in the first surface 111 of the substrate 110a, sufficient convection is provided on the first surface 111 of the substrate 110a, and that little turbulence is caused to remote airflow. As such, when the heat dissipation efficiency of the wavelength conversion module 100a is increased, operation noise generated by the wavelength conversion module 100a is reduced at the same time. Further, the turbulent portions 112a in this embodiment are formed on the first surface 111 of the substrate 110a through punching. The punching manner adopted by this embodiment is compatible with a substrate processing process of a conventional wavelength conversion module. In this way, requirements for heat dissipation and noise reduction are satisfied without an increase in manufacturing costs.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiments for the omitted contents, which will not be repeated hereinafter.

Figure 3:
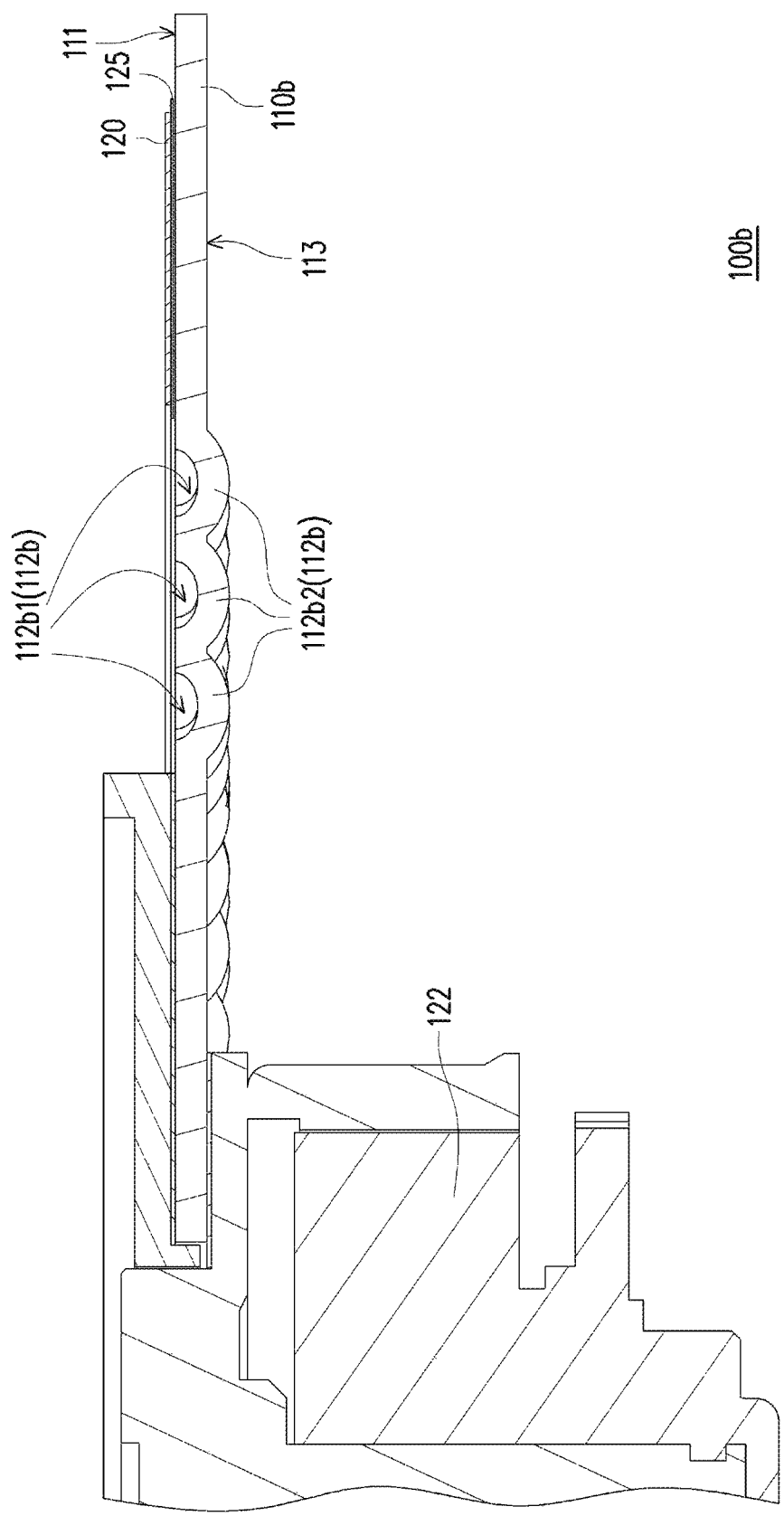
FIG. 3 is a local cross-sectional schematic view of a wavelength conversion module according to another embodiment of the disclosure.

FIG. 3 is a local cross-sectional schematic view of a wavelength conversion module according to another embodiment of the disclosure. With reference to FIG. 2C and FIG. 3 together, a wavelength conversion module 100b in this embodiment is similar to the wavelength conversion module 100a in FIG. 2B, and a difference therebetween is that: turbulent portions 112b in this embodiment include a plurality of first turbulent portions 112b1 and a plurality of second turbulent portions 112b2. Herein, the first turbulent portions 112b1 are recessed in the first surface 111, and the second turbulent portions 112b2 are disposed corresponding to the first turbulent portions 112b1 and protrude from the second surface 113. That is, the turbulent portions 112b form the first turbulent portions 112b1 recessed in the first surface 111 and the second turbulent portions 112b2 protruding from the second surface 113 through punching performed on a substrate 110b.

Figure 4A:
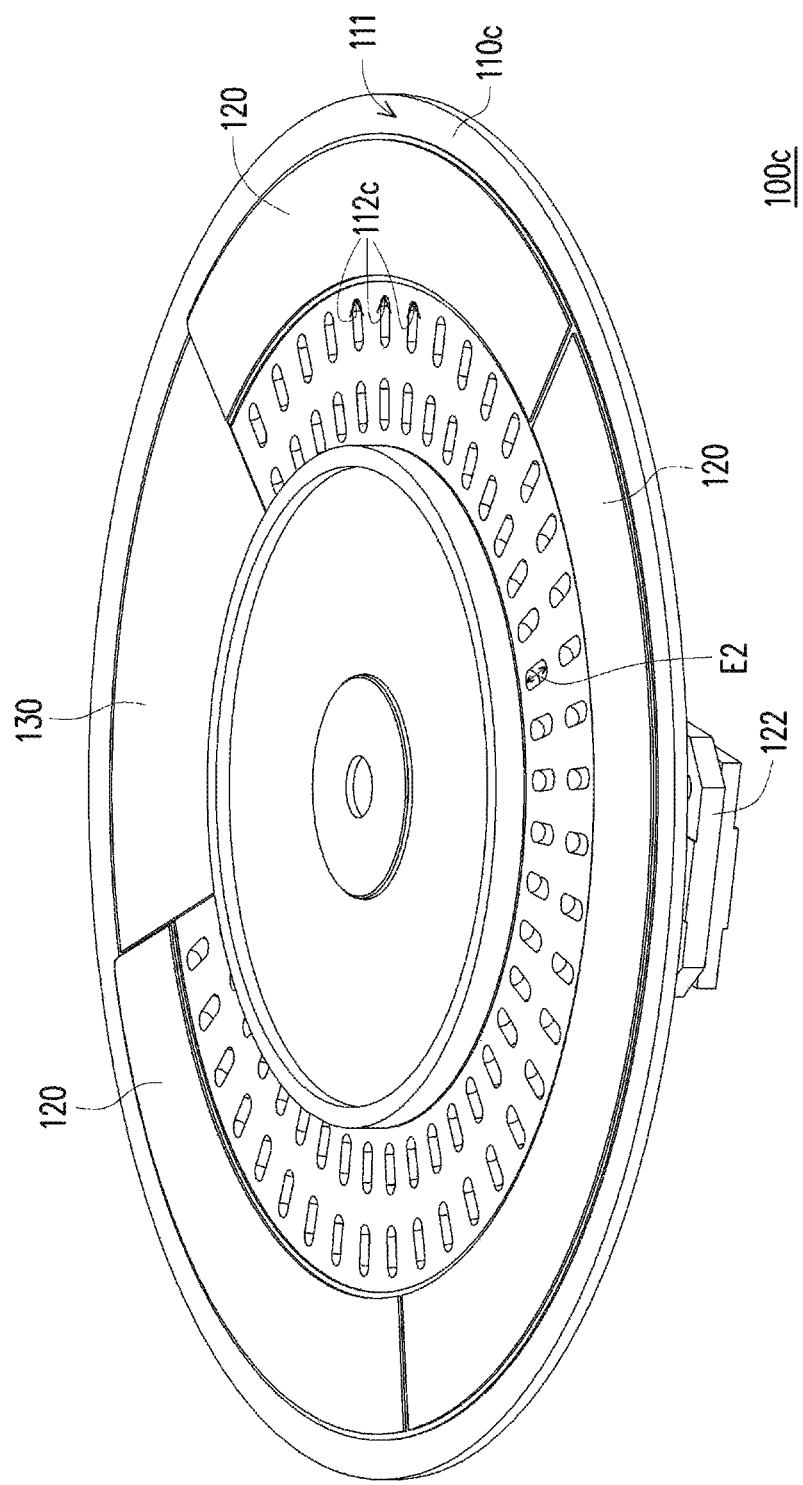
FIG. 4A is a three-dimensional schematic view of a wavelength conversion module according to another embodiment of the disclosure.
Figure 4B:
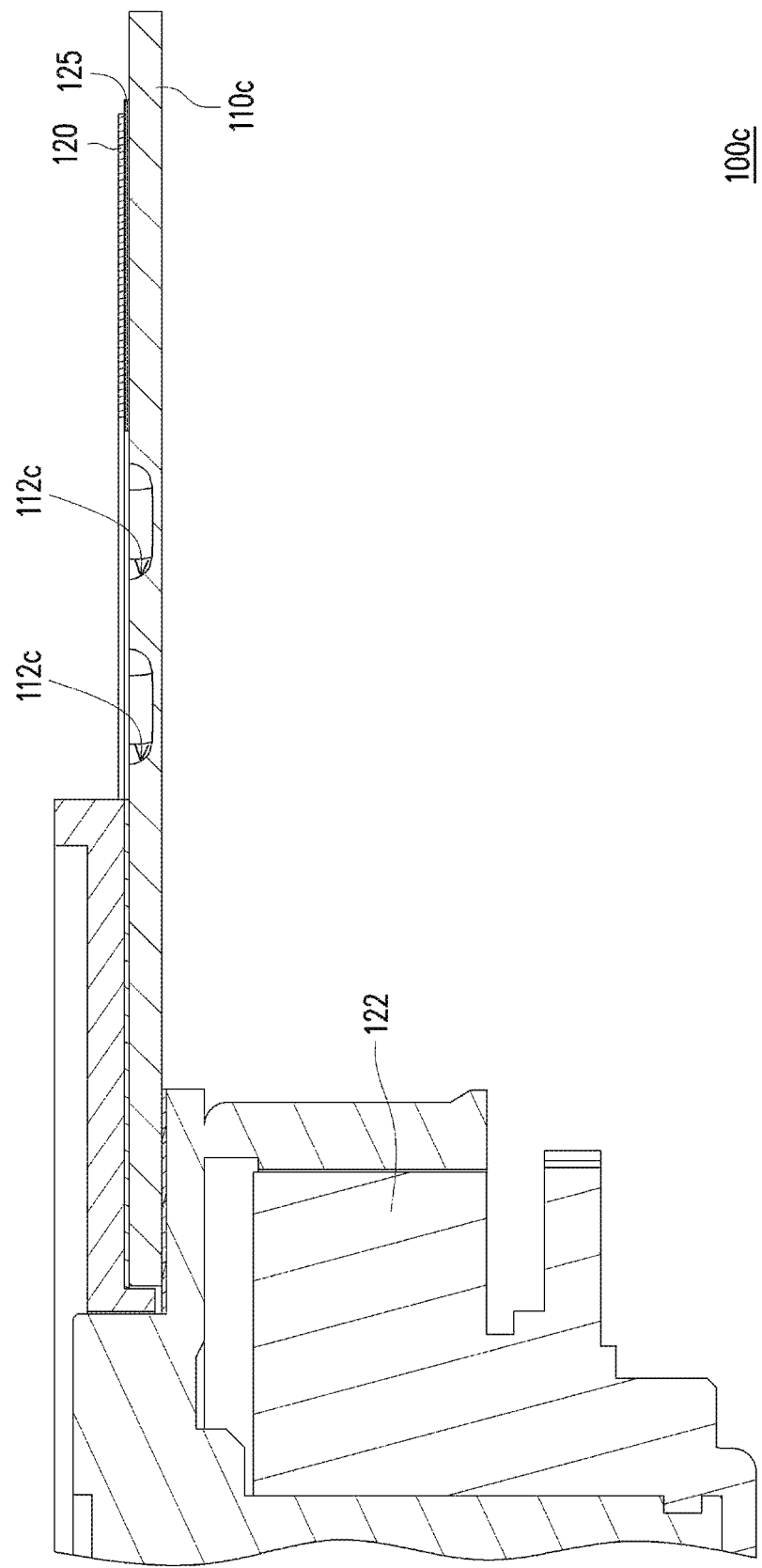
FIG. 4B is a local cross-sectional schematic view of the wavelength conversion module of FIG. 4A.

FIG. 4A is a three-dimensional schematic view of a wavelength conversion module according to another embodiment of the disclosure. FIG. 4B is a local cross-sectional schematic view of the wavelength conversion module of FIG. 4A. With reference to FIG. 2A, FIG. 4A, and FIG. 4B together, a wavelength conversion module 100c in this embodiment is similar to the wavelength conversion module 100a in FIG. 2A, and a difference therebetween is that: a longest side E2 of each turbulent portion 112c in this embodiment is parallel to the radial direction. Herein, a cross-sectional shape of each turbulent portion 112c is, but not limited to, a semi-capsule shape, for example.

Figure 5A:
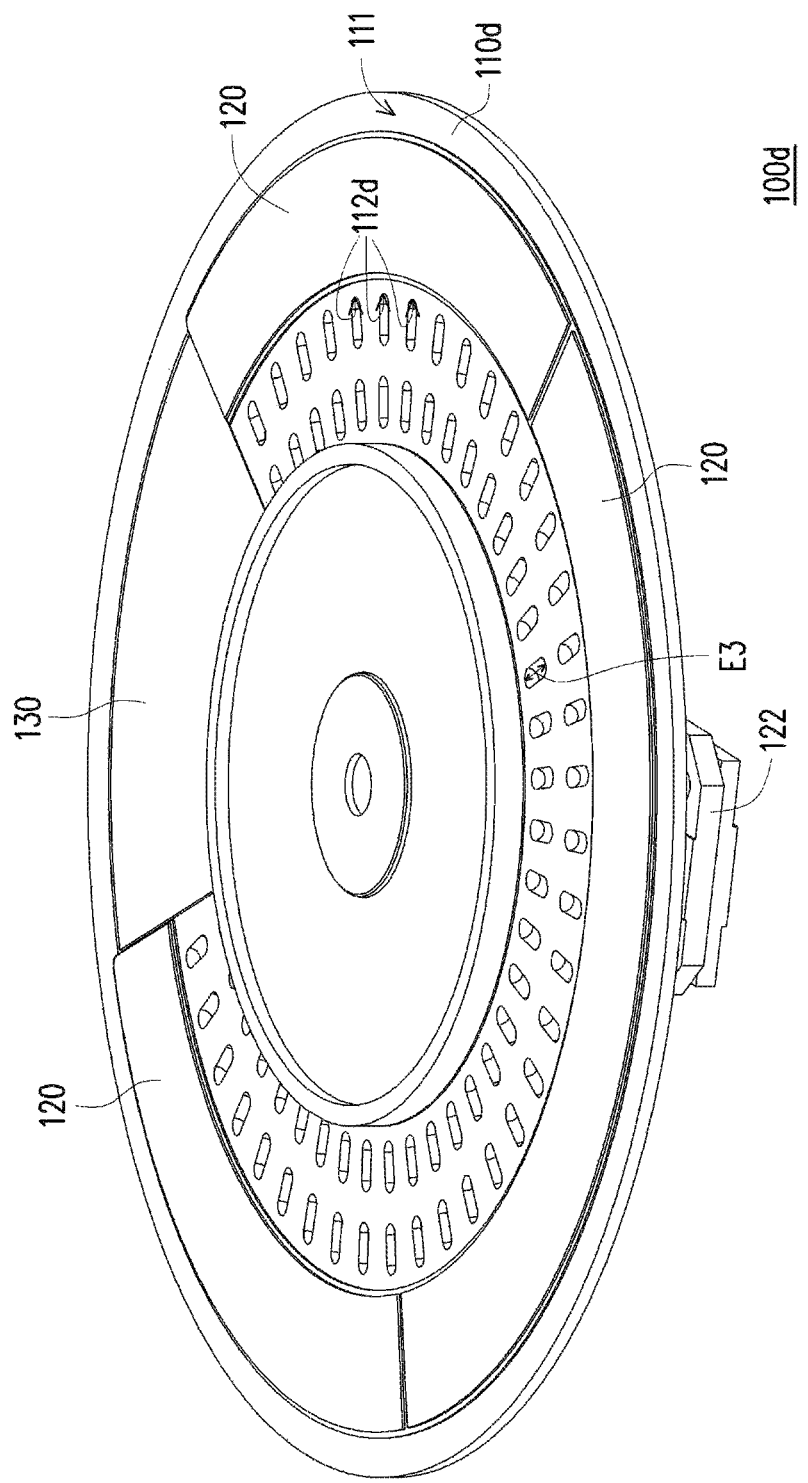
FIG. 5A is a three-dimensional schematic view of a wavelength conversion module according to another embodiment of the disclosure.
Figure 5B:
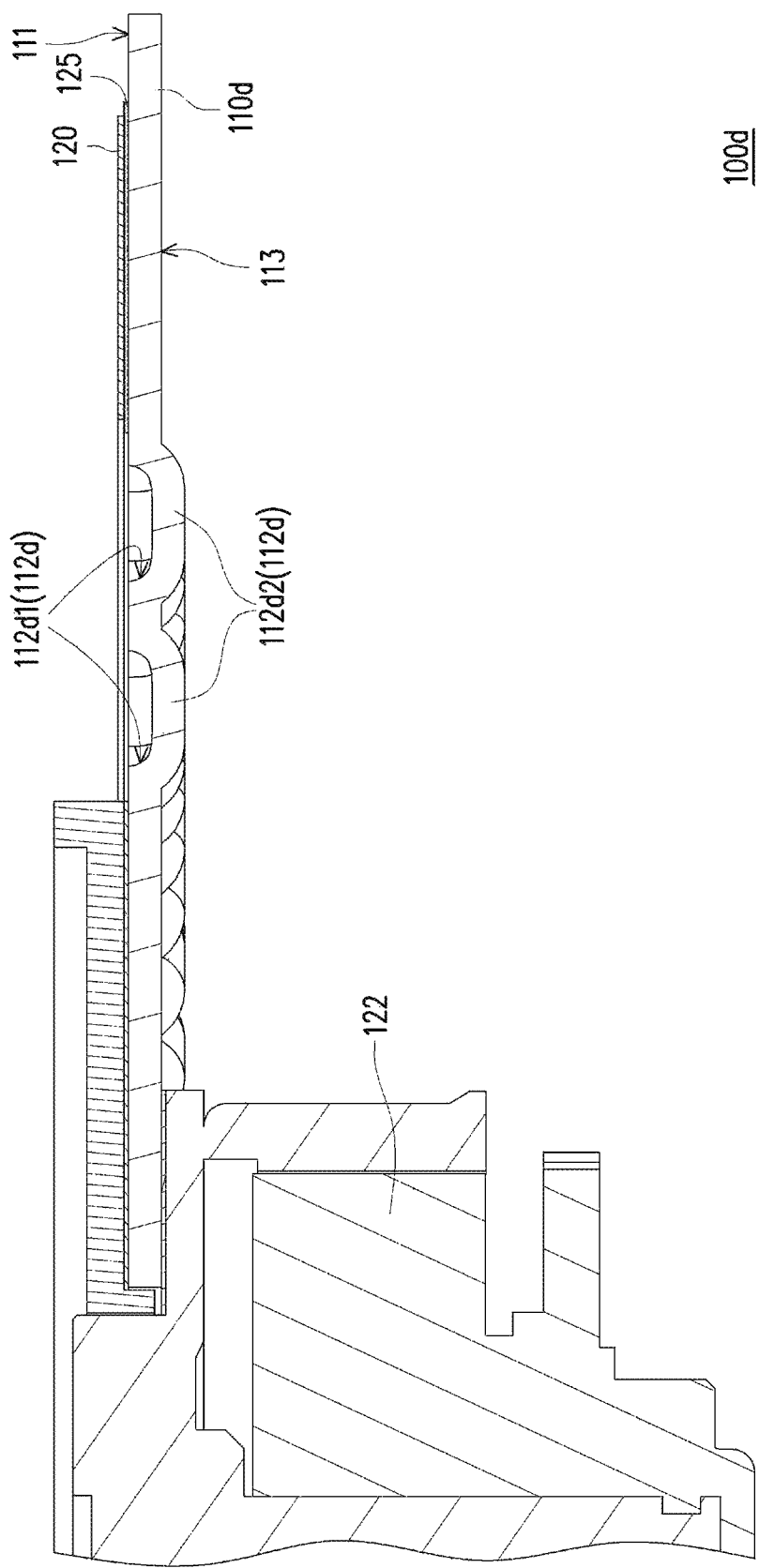
FIG. 5B is a local cross-sectional schematic view of the wavelength conversion module of FIG. 5A.

FIG. 5A is a three-dimensional schematic view of a wavelength conversion module according to another embodiment of the disclosure. FIG. 5B is a local cross-sectional schematic view of the wavelength conversion module of FIG. 5A. With reference to FIG. 3, FIG. 5A, and FIG. 5B together, a wavelength conversion module 100d in this embodiment is similar to the wavelength conversion module 100b in FIG. 3, and a difference therebetween is that: turbulent portions 112d in this embodiment include a plurality of first turbulent portions 112d1 and a plurality of second turbulent portions 112d2. The first turbulent portions 112d1 are recessed in the first surface 111, the second turbulent portions 112d2 are disposed corresponding to the first turbulent portions 112d1 and protrude from the second surface 113, and a longest side E3 of each of the turbulent portions 112d is parallel to the radial direction. A cross-sectional shape of each of the turbulent portions 112d is, but not limited to, a semi-capsule shape, for example.

Figure 6:
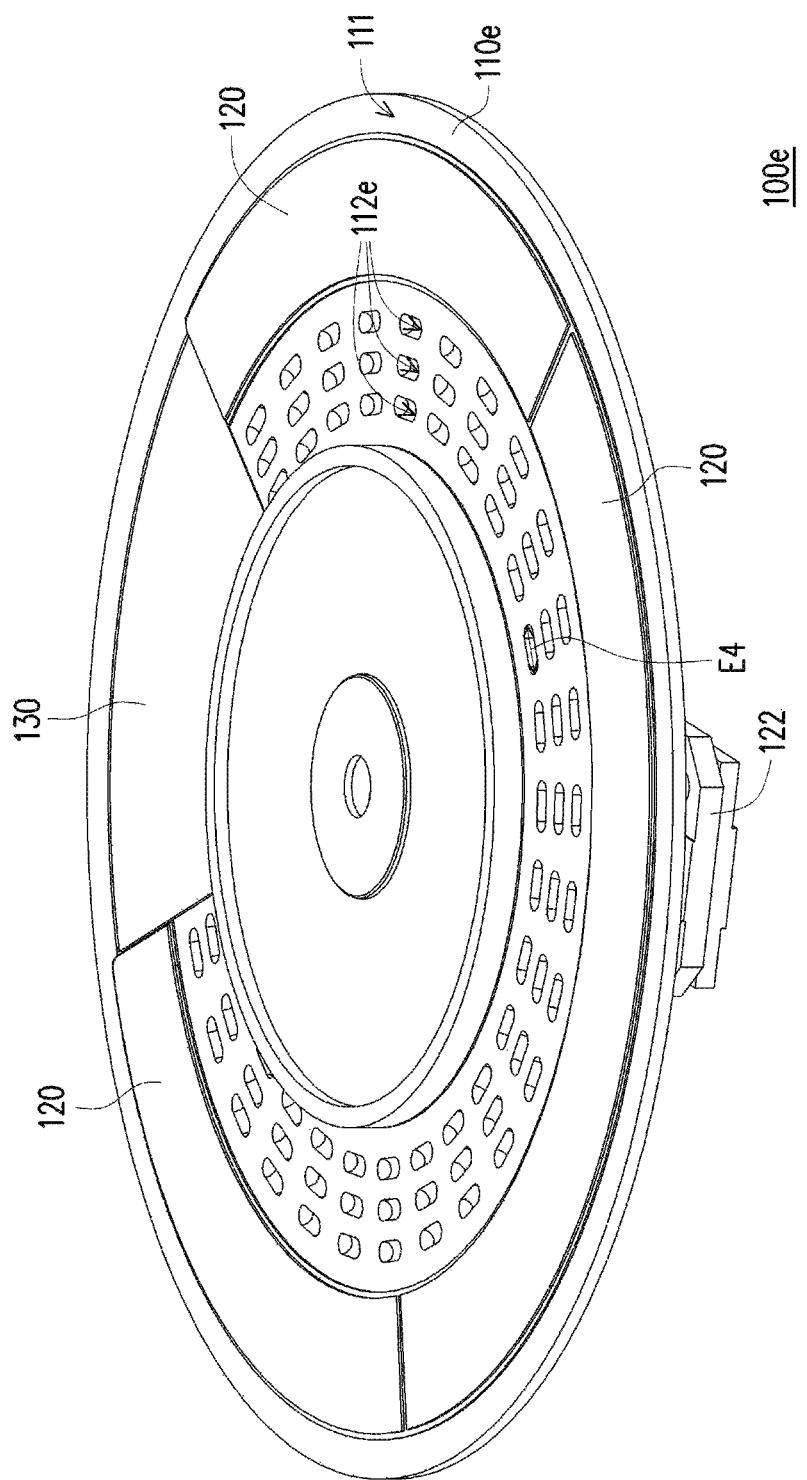
FIG. 6 is a three-dimensional schematic view of a wavelength conversion module according to another embodiment of the disclosure.

FIG. 6 is a three-dimensional schematic view of a wavelength conversion module according to another embodiment of the disclosure. With reference to FIG. 5A and FIG. 6 together, a wavelength conversion module 100e in this embodiment is similar to the wavelength conversion module 100d in FIG. 5A, and a difference therebetween is that: a longest side E4 of each turbulent portion 112e in this embodiment is perpendicular to the radial direction.

Figure 7A:
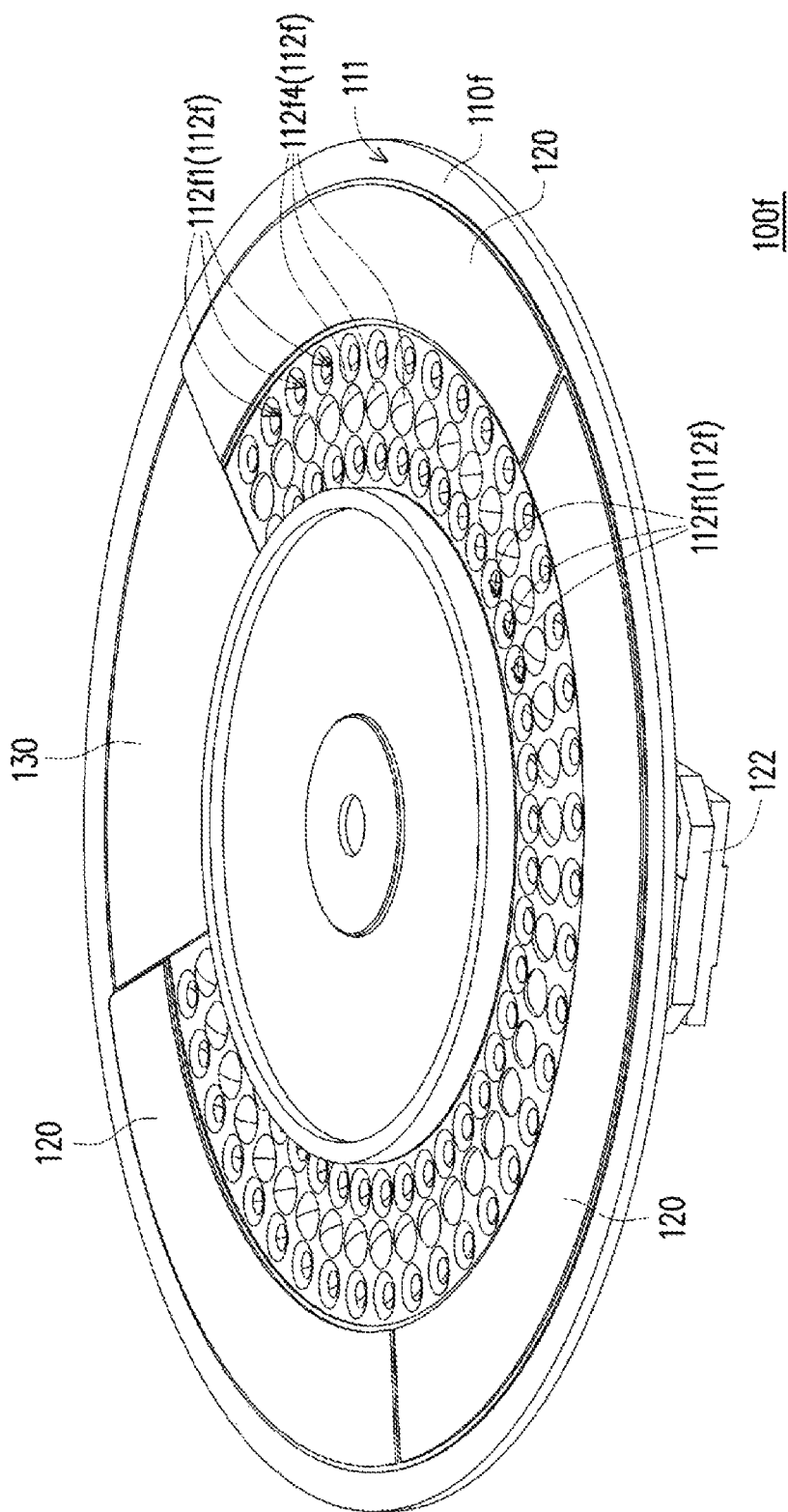
FIG. 7A is a three-dimensional schematic view of a wavelength conversion module according to another embodiment of the disclosure.
Figure 7B:
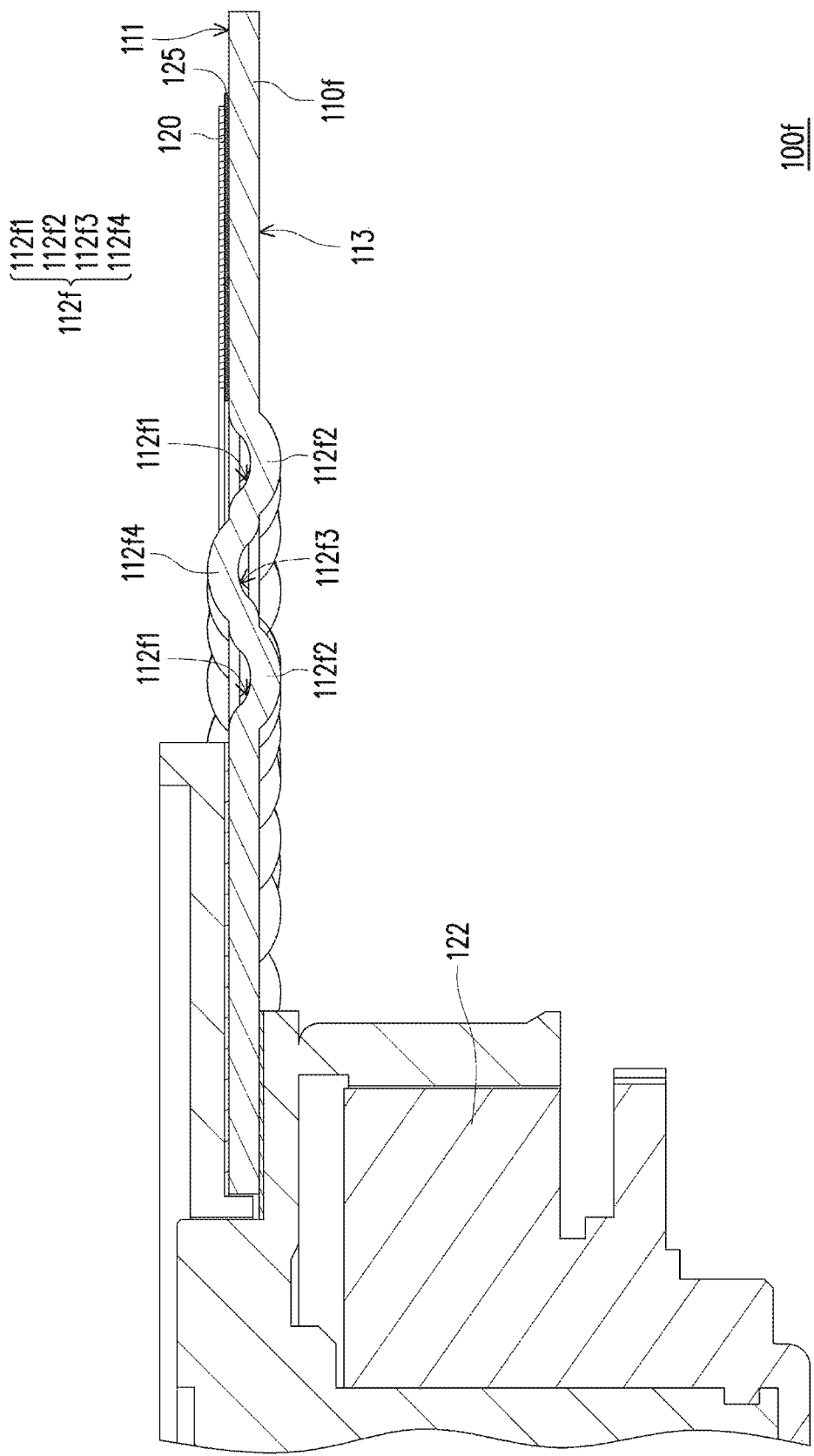
FIG. 7B is a local cross-sectional schematic view of the wavelength conversion module of FIG. 7A.

FIG. 7A is a three-dimensional schematic view of a wavelength conversion module according to another embodiment of the disclosure. FIG. 7B is a local cross-sectional schematic view of the wavelength conversion module of FIG. 7A. With reference to FIG. 2A, FIG. 2C, FIG. 7A, and FIG. 7B together, a wavelength conversion module 100f in this embodiment is similar to the wavelength conversion module 100a in FIG. 2A, and a difference therebetween is that: turbulent portions 112f in this embodiment include a plurality of first turbulent portions 112f1, a plurality of second turbulent portions 112f2, a plurality of third turbulent portions 112f3, and a plurality of fourth turbulent portions 112f4. The first turbulent portions 112f1 are recessed in the first surface 111, and the second turbulent portions 112f2 are disposed corresponding to the first turbulent portions 112f1 and protrude from the second surface 113. The third turbulent portions 112f3 are recessed in the first surface 113, and the fourth turbulent portions 112f4 are disposed corresponding to the third turbulent portions 112f3 and protrude from the second surface 111. Herein, the first turbulent portions 112f1 and the third turbulent portions 112f3 are arranged in an alternating manner in the same radial direction.

Figure 8A:
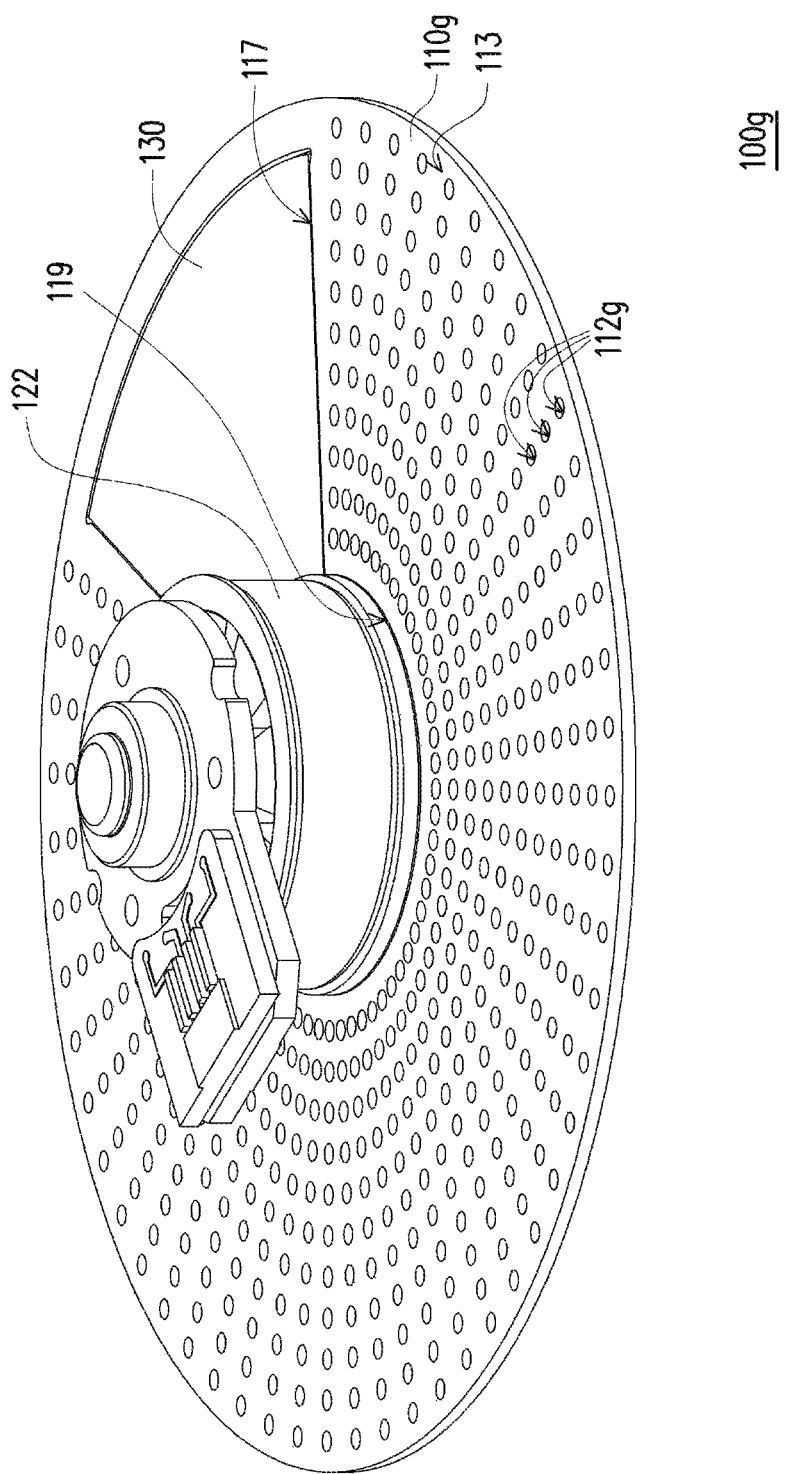
FIG. 8A is a three-dimensional schematic view of a wavelength conversion module according to another embodiment of the disclosure.
Figure 8B:
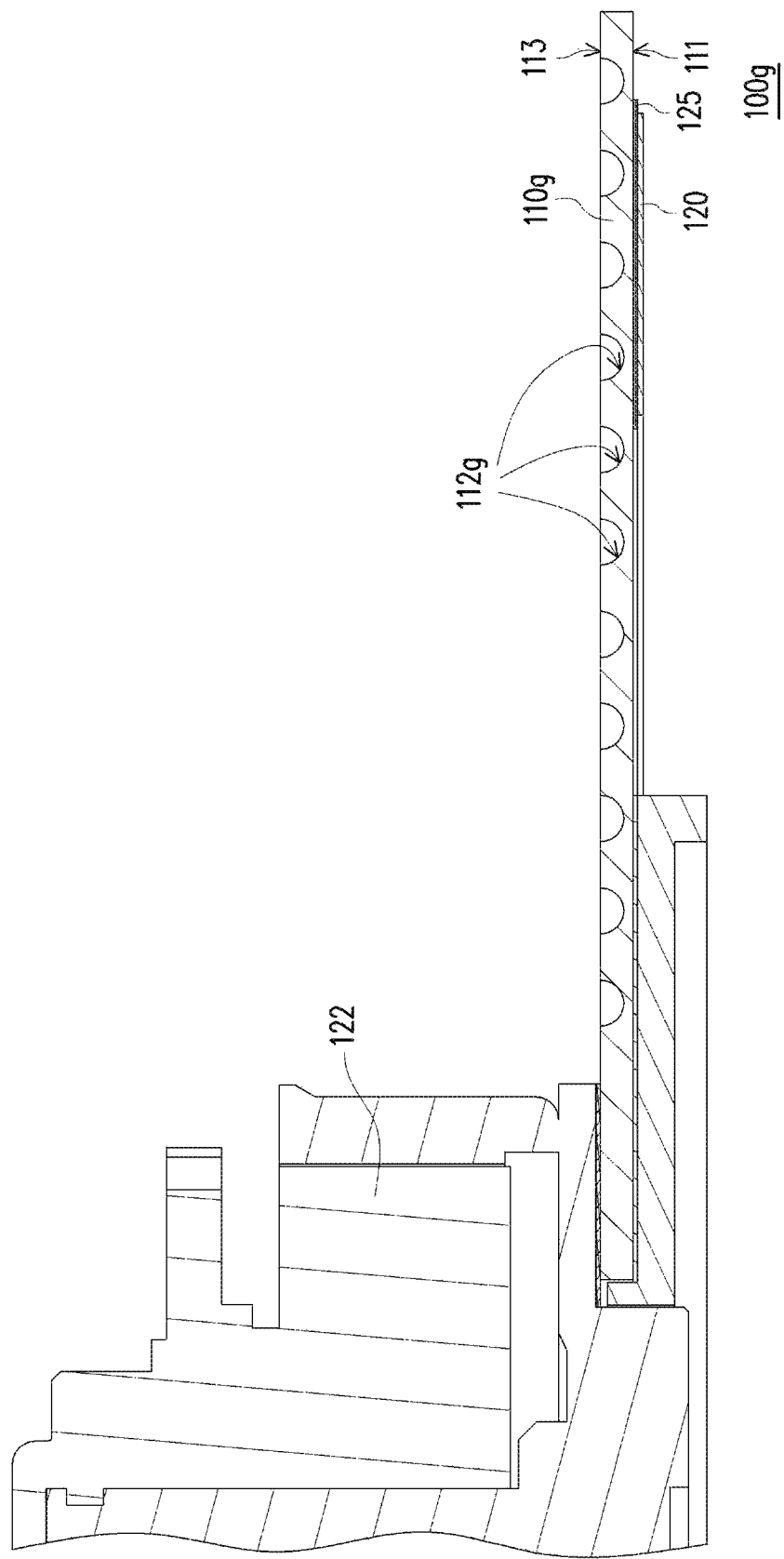
FIG. 8B is a local cross-sectional schematic view of the wavelength conversion module of FIG. 8A.
Figure 9A:
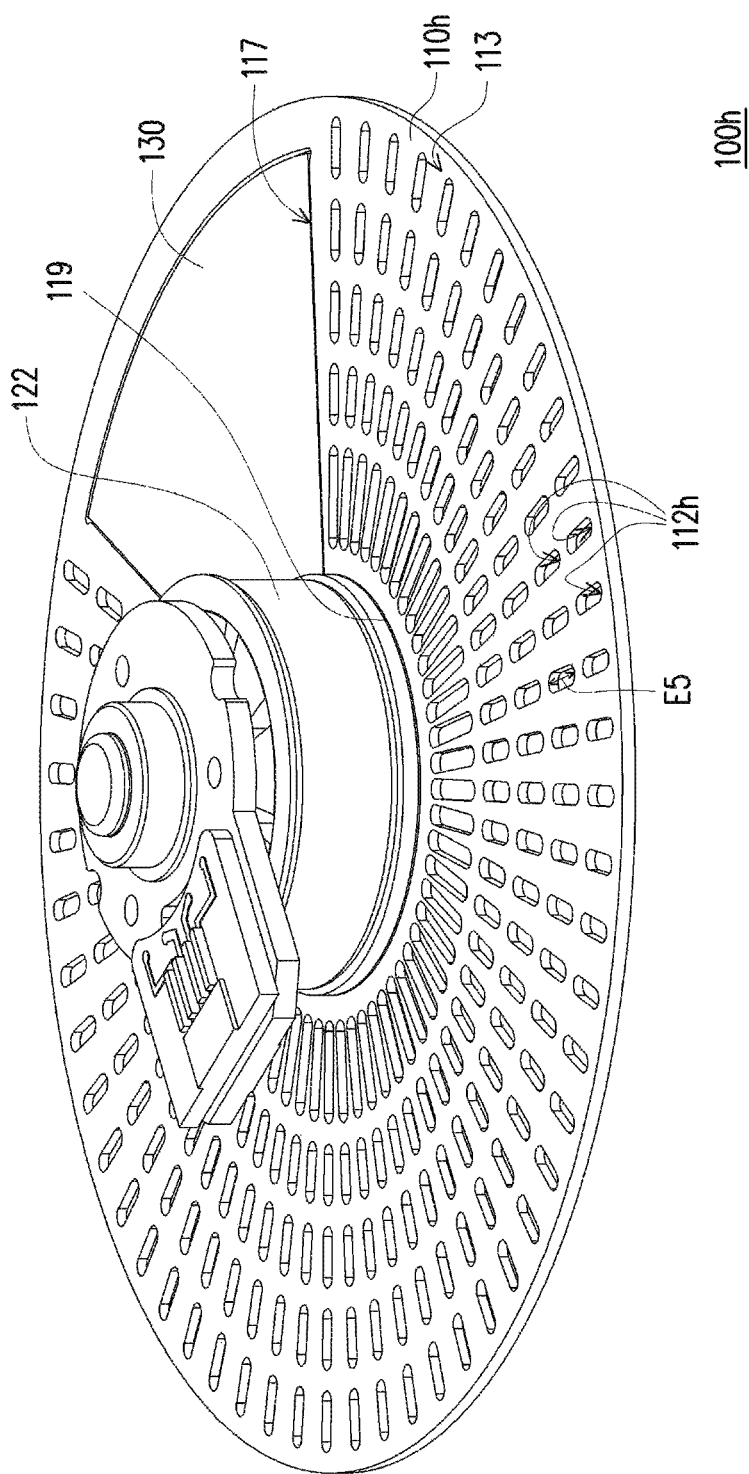
FIG. 9A is a three-dimensional schematic view of a wavelength conversion module according to another embodiment of the disclosure.
Figure 9B:
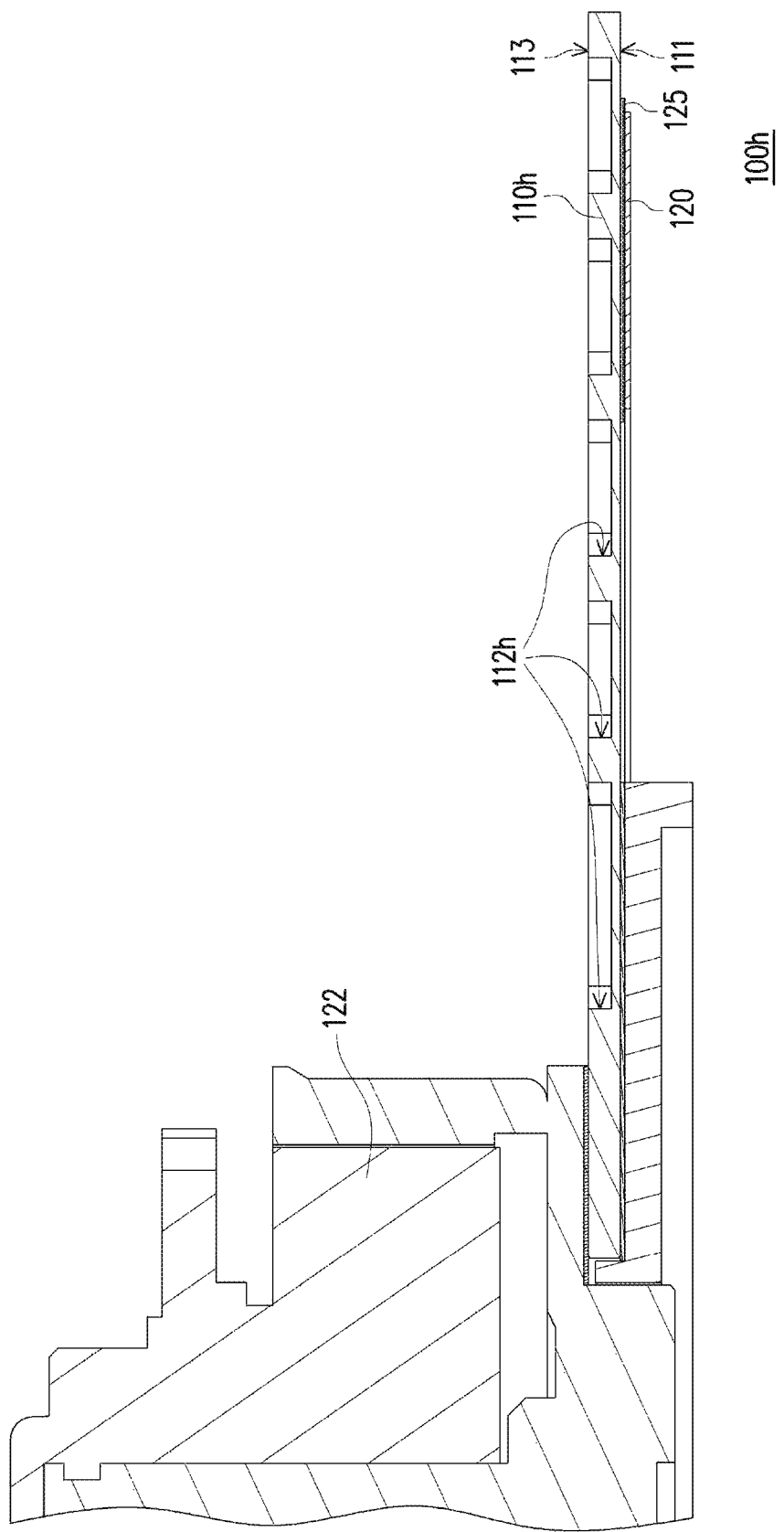
FIG. 9B is a local cross-sectional schematic view of the wavelength conversion module of FIG. 9A.

FIG. 8A is a three-dimensional schematic view of a wavelength conversion module according to another embodiment of the disclosure. FIG. 8B is a local cross-sectional schematic view of the wavelength conversion module of FIG. 8A. With reference to FIG. 2A, FIG. 2C, FIG. 8A, and FIG. 8B together, a wavelength conversion module 100g in this embodiment is similar to the wavelength conversion module 100a in FIG. 2A, and a difference therebetween is that: an exposure area of a substrate 110g in this embodiment is a regional area on the second surface 113 outside the optical region 117 and the holder region 119. Herein, turbulent portions 112g are recessed in the second surface 113 of the substrate 110g. In the embodiment of FIG. 8A and FIG. 8B, the turbulent portions 112g are recessed in the second surface 113 of the substrate 110g, and the turbulent portions 112g may be formed in a region of the second surface 113 corresponding to the wavelength conversion region 115 of the first surface 111. To be specific, in the process when the turbulent portions 112g are formed, after punching is performed on the second surface 113 of the substrate 110g, protrusions are correspondingly formed on the first surface 111, and the protrusions on the first surface 111 may then be polished through a polishing manner. In this way, the wavelength conversion region 115 of the first surface 111 corresponding to the turbulent portions 112g is certain to be a flat surface and thus is conducive to arrangement of the wavelength conversion layer 120, and a favorable heat dissipation effect is also provided. FIG. 9A is a three-dimensional schematic view of a wavelength conversion module according to another embodiment of the disclosure. FIG. 9B is a local cross-sectional schematic view of the wavelength conversion module of FIG. 9A. With reference to FIG. 8A, FIG. 8B, FIG. 9A, and FIG. 9B together, a wavelength conversion module 100h in this embodiment is similar to the wavelength conversion module 100g in FIG. 8A, and a difference therebetween is that: a longest side E5 of each turbulent portion 112h in this embodiment is parallel to the radial direction. Herein, a cross-sectional shape of each turbulent portion 112h is, but not limited to, a rectangle, for example.

Figure 10A:
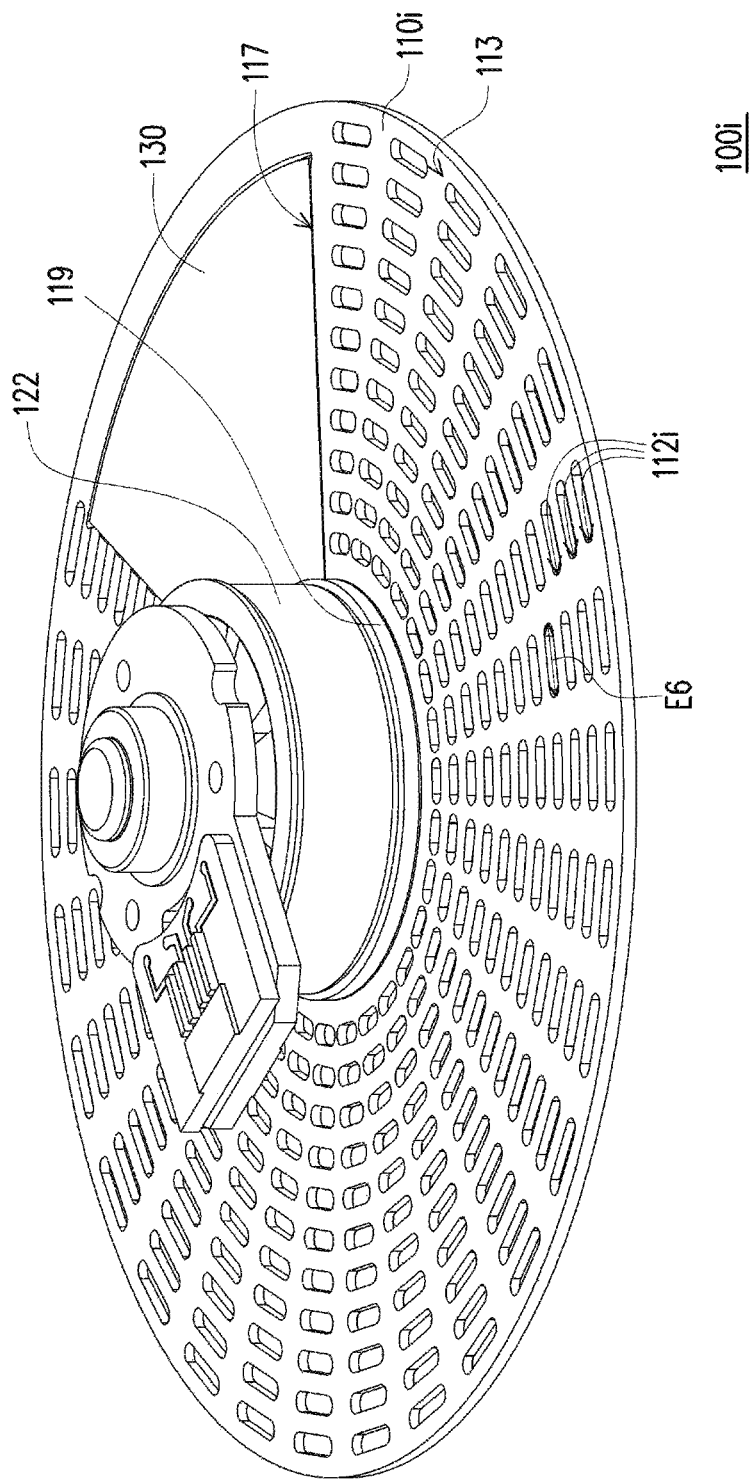
FIG. 10A is a three-dimensional schematic view of a wavelength conversion module according to another embodiment of the disclosure.
Figure 10B:
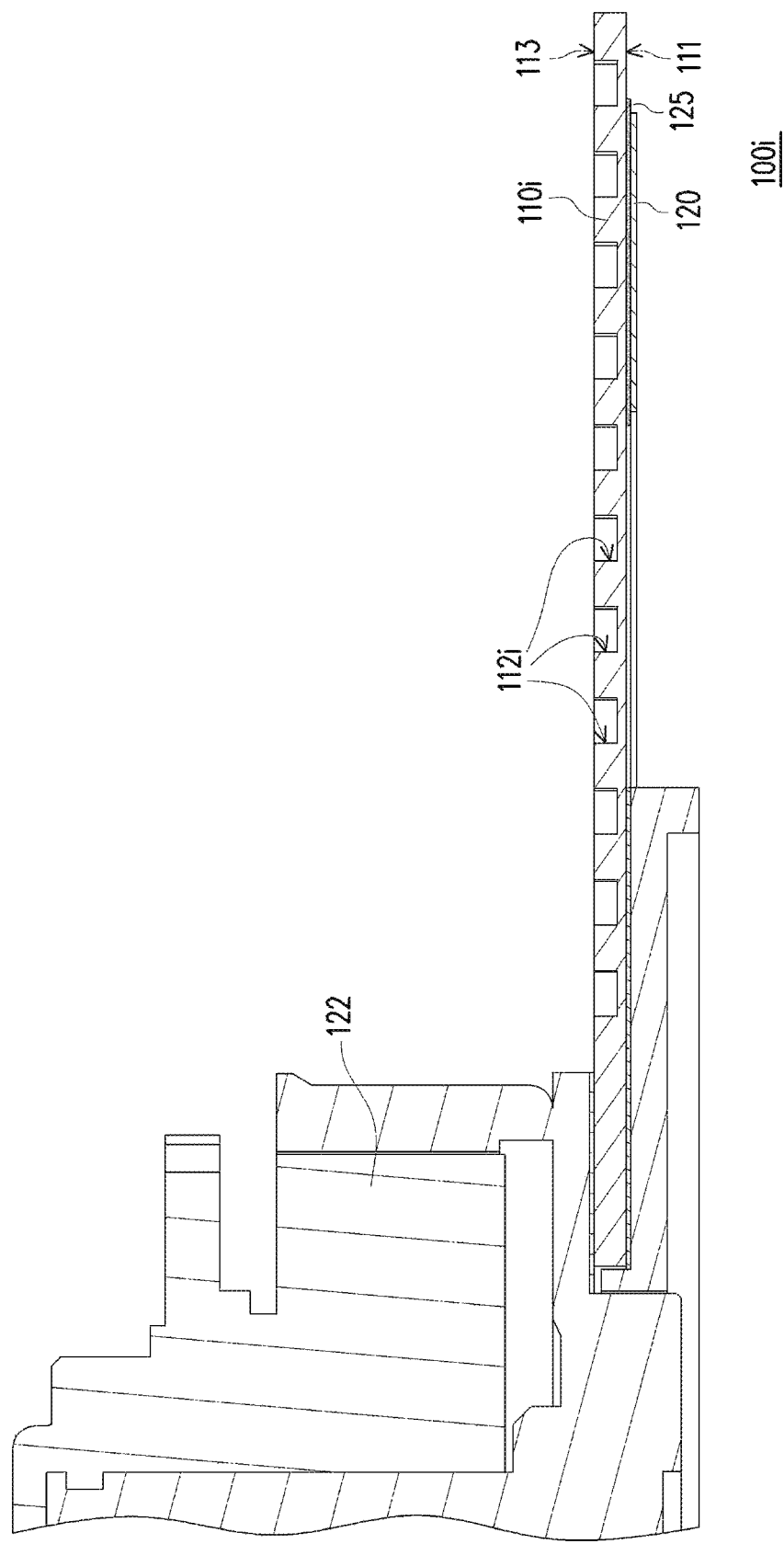
FIG. 10B is a local cross-sectional schematic view of the wavelength conversion module of FIG. 10A.

FIG. 10A is a three-dimensional schematic view of a wavelength conversion module according to another embodiment of the disclosure. FIG. 10B is a local cross-sectional schematic view of the wavelength conversion module of FIG. 10A. With reference to FIG. 8A, FIG. 8B, FIG. 10A, and FIG. 10B together, a wavelength conversion module 100i in this embodiment is similar to the wavelength conversion module 100g in FIG. 8A, and a difference therebetween is that: a longest side E6 of each turbulent portion 112i in this embodiment is perpendicular to the radial direction. Herein, a cross-sectional shape of each turbulent portion 112i is, but not limited to, a rectangle, for example.

In view of the foregoing, the embodiments of the disclosure have at least one of the following advantages or effects. In the embodiments of the disclosure, the turbulent portions may be recessed-type turbulent portions recessed in the first surface or may be recessed-type turbulent portions recessed in the second surface, or the turbulent portions include both recessed-type and protruding-type turbulent portions. In the disclosure, the distribution area of the turbulent portions accounts for more than 60% of the exposure area of the substrate. Therefore, the substrate has a large heat dissipation area through such design of the turbulent portions, and heat dissipation efficiency of the wavelength conversion module and the projector adopting the wavelength conversion module is accordingly increased. Further, in the disclosure, the turbulent portions at least include the recessed-type turbulent portions recessed in the substrate, so that sufficient convection is provided on the surface of the substrate, and little turbulence is caused to the remote airflow. As such, when the heat dissipation efficiency of the wavelength conversion module is increased, operation noise generated by the wavelength conversion module is reduced at the same time. In addition, in the disclosure, since the turbulent portions are formed through punching performed on the substrate, the punching manner adopted by the disclosure is compatible with a substrate processing process of a conventional wavelength conversion module. In this way, requirements for heat dissipation and noise reduction are satisfied without an increase in manufacturing costs.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising a substrate and a wavelength conversion layer, wherein:
   the substrate has a first surface and a second surface opposite to each other, and the substrate comprises a plurality of turbulent portions, wherein the turbulent portions are recessed in the second surface, and
   the wavelength conversion layer is disposed on the first surface of the substrate, wherein the wavelength conversion layer is located on a wavelength conversion region of the first surface, the wavelength conversion region of the first surface corresponds to a region of the second surface having a part of the plurality of turbulent portions, the part of the plurality of turbulent portions, formed by punching, are with a scale of millimeter.

2. The wavelength conversion module according to claim 1, wherein a length of a longest side of each of the turbulent portions is less than 10% of a diameter of the substrate.

3. The wavelength conversion module according to claim 1, wherein a depth of each of the turbulent portions is less than or equal to 0.5 millimeters.

4. The wavelength conversion module according to claim 1, wherein a material of the substrate comprises metal.

5. The wavelength conversion module according to claim 1, wherein the substrate has the wavelength conversion region and an optical region disposed in an adjacent manner in a circumferential direction, wherein a reflective structure or a transparent structure is located in the optical region.

6. The wavelength conversion module according to claim 5, further comprising:
   a driver assembly, wherein the substrate further comprises a holder region, the wavelength conversion region surrounds the holder region, and the driver assembly is located in the holder region and is configured to drive the substrate to rotate.

7. The wavelength conversion module according to claim 6, wherein the turbulent portions are equally spaced and arranged in an array in a radial direction and the circumferential direction of the substrate.

8. The wavelength conversion module according to claim 7, wherein the exposure area of the substrate is a regional area on the first surface outside the holder region, the wavelength conversion region, and the optical region.

9. The wavelength conversion module according to claim 8, wherein the turbulent portions comprise a plurality of first turbulent portions, a plurality of second turbulent portions, a plurality of third turbulent portions, and a plurality of fourth turbulent portions, the first turbulent portions are recessed in the first surface, the second turbulent portions are disposed corresponding to the first turbulent portions and protrude from the second surface, the third turbulent portions are recessed in the second surface, the fourth turbulent portions are disposed corresponding to the third turbulent portions and protrude from the first surface, and the first turbulent portions and the third turbulent portions are arranged in an alternating manner in a same radial direction.

10. The wavelength conversion module according to claim 7, wherein the exposure area of the substrate is a regional area on the second surface outside the optical region and the holder region.

11. The wavelength conversion module according to claim 1, wherein a longest side of each of the turbulent portions is parallel to or perpendicular to the radial direction.

12. The wavelength conversion module according to claim 1, wherein shapes of the turbulent portions are completely or partially identical.

13. The wavelength conversion module according to claim 1, wherein a cross-sectional shape of each of the turbulent portions comprises a semicircular, a half-capsule shape, or a rectangle.

14. A projector, comprising an illumination system, a light valve, and a projection lens, wherein
   the illumination system is configured to provide an illumination beam, the illumination system comprises a light source and a wavelength conversion module, wherein:
   the light source is configured to provide an excitation beam, and
   the wavelength conversion module is disposed in a transmission path of the excitation beam, and the wavelength conversion module comprises a substrate and a wavelength conversion layer, wherein:
   the substrate has a first surface and a second surface opposite to each other, and the substrate comprises a plurality of turbulent portions, wherein the turbulent portions are recessed in the second surface, and
   the wavelength conversion layer is disposed on the first surface of the substrate, wherein the wavelength conversion layer is located on a wavelength conversion region of the first surface, the wavelength conversion region of the first surface corresponds to a region of the second surface having a part of the plurality of turbulent portions, the part of the plurality of turbulent portions, formed by punching, are with a scale of millimeter, the wavelength conversion layer is configured to convert the excitation beam into a conversion beam, and the illumination beam comprises the conversion beam, the light valve is disposed in the transmission path of the illumination beam and is configured to convert the illumination beam into an image beam, and the projection lens is disposed in a transmission path of the image beam and is configured to project the image beam out of the projector.

* * * * *